Nov. 8, 1932.  V. E. ROYLE  1,886,592

STOCK SCREW FOR EXTRUDING MACHINES

Filed June 1, 1929

INVENTOR
BY Vernon E. Royle
his ATTORNEYS

Patented Nov. 8, 1932

1,886,592

UNITED STATES PATENT OFFICE

VERNON E. ROYLE, OF PATERSON, NEW JERSEY

STOCK SCREW FOR EXTRUDING MACHINES

Application filed June 1, 1929. Serial No. 367,750.

This invention relates to a stock screw for extruding machines, and has for an object to provide such a screw which embodies the advantages of both single and double thread screws.

Another object consists in providing such an article that includes a double thread for a portion of its length and a single thread for the remainder.

Another object consists in providing such an article in which the double thread portion is adjacent the shank of the screw so as to register with the throat or infeed of the machine.

Another object consists in providing such an article which includes two double threaded portions and two single threaded portions alternately arranged.

A further object consists in providing certain improvements in the form, construction and arrangement of the article, whereby the above named and other objects may effectively be attained.

Figure 1:
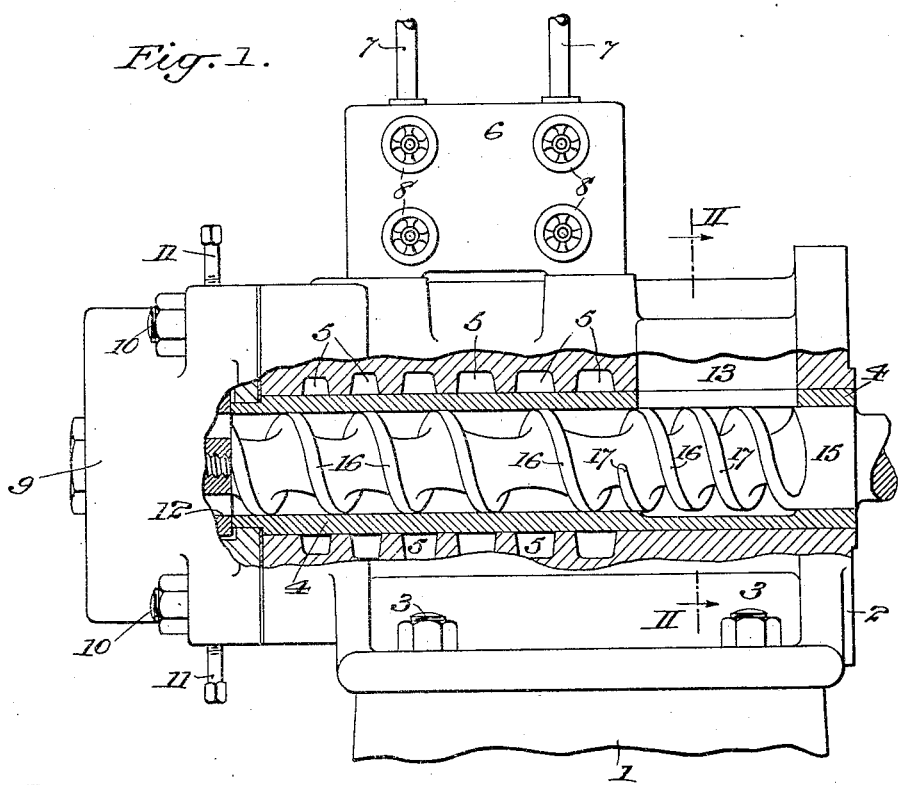
Figure 2:
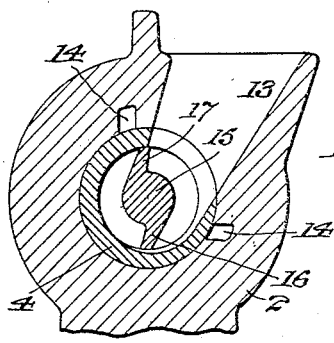
Figure 3:
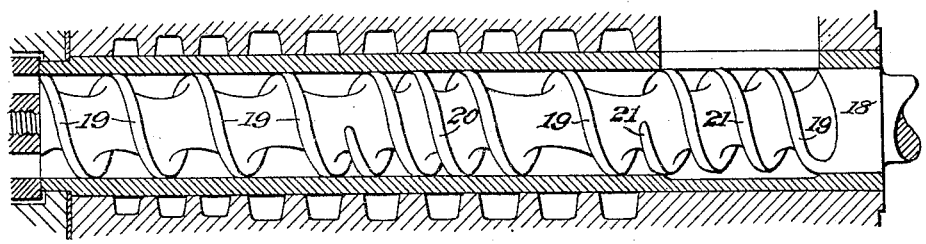

A practical embodiment of the invention is represented in the accompanying drawing in which Fig. 1 represents a detail elevation, partly in section, of a tubing machine including a screw according to my invention, Fig. 2 represents a section taken in the plane of the line II—II of Fig. 1, looking in the direction of the arrows, and Fig. 3 represents a detail longitudinal section, partly in elevation, showing a modified form.

Originally, stock screws or plodders for tubing or extruding machines had a single thread, and forms were thereafter devised in which a double thread was employed in order to feed a greater amount of the material to be extruded such, for instance, as rubber compound.

The single thread form of screw has certain advantages, in that it is cheaper to manufacture, requires less power for its operation, and imparts a more forcible feed to the material; but the double thread form, while being less advantageous than the single thread in the respects just mentioned, has its own characteristic advantage in that it handles a greater amount of the material in any given period of time by feeding it more rapidly.

My invention contemplates obtaining the advantages of both the single and double thread forms, while minimizing their disadvantages; and it also contemplates inherent advancements characteristic of its particular structure.

The preferred form of stock screw constituting my invention is shown in Figs. 1 and 2 of the accompanying drawing as constituting part of a tubing or extruding machine which, in other respects, is of well known and approved form.

The housing or pedestal for supporting the cylinder is denoted by 1 and the cylinder 2 is secured thereto by suitable bolts 3. A bore liner 4 is fitted in the cylinder and is surrounded by passages 5 for the usual temperature controlling medium that is fed from chest 6, which has suitable pipes 7 for inlet and outlet and suitable hand valves 8 for controlling the same.

The head 9 is fast to the cylinder 2 by bolts 10 and it carries adjusting screws 11 for the core bridge 12, in a well understood manner.

The cylinder is cut away at 13 to provide a throat for the infeed of material, and this part of the cylinder is also formed with passages 14 for circulation of the temperature controlling medium.

The stock screw or plodder is denoted by 15, is arranged within the bore liner 4 in the usual way, and has its shank in operative engagement with driving mechanism of approved form for turning it during the actuation of the machine.

It will be observed that the screw has a thread 16 which is of gradually decreasing pitch in that portion forwardly from the throat 13 and that there is an additional thread 17 on that portion of the screw adjacent the shank; so that the screw may properly be described as having a double thread on the portion near the shank and a single thread for the remainder of its length.

The portion which is double threaded lies in alignment with the throat 13 for the infeeding of the material to be extruded, and this double thread has the capacity of drawing in a much greater amount of material than would a single thread. After the said material has been thus drawn into the bore liner 4, it is fed forwardly therein by the screw and extruded from the head 9 in the usual manner. The fact that the screw is single threaded forwardly of the throat provides more forcible movement of the material drawn in by the double threaded portion so as to facilitate the output of the machine and lead to a more homogeneous product. Furthermore, the fact that the screw is single threaded for a substantial portion of its length greatly reduces the power required for its turning in operation, and permits a certain expansion of the material as it leaves the double threaded portion.

This form of screw is exceptionally adapted to the infeeding of strip material such, for instance, as is provided by a rubber calender, largely because the double threaded portion will receive and draw in the material without severing the strip. Another advantage resides in the fact that it is cheaper to manufacture this form of screw than one which is double threaded throughout its length.

The extruding machine embodying my invention may be operated in the usual manner, as for the production of rods or tubes, and the like, or for the straining of rubber during the reclaiming process; but it will be found that the output of the machine is increased without corresponding increase in power consumed and that the product is improved, because of the construction of the screw having the advantages above described.

Referring to the modified form shown in Fig. 3, it may be said that the machine parts in general are the same as those shown in Figs. 1 and 2, except that the cylinder and bore liner are longer. The difference resides in the screw or plodder itself, which is here marked 18 and has two double threaded portions and two single threaded portions. The single thread is denoted by 19 throughout and the double threads by 20 and 21. As in the case of the preferred form, the single thread 19 gradually decreases in pitch in that portion which is forward of the throat. The operation of this modified form of screw differs from the preferred form in that there are two portions at which the material is fed rapidly and in large quantity by the double threads, and two other portions at which the material is allowed to expand and is fed more slowly and more forcibly. The alternate arrangement of these portions accomplishes a more thorough mixing and kneading of the material and also promotes the extrusion of a better product under certain conditions.

It will be understood that various changes may be resorted to in the form, construction and arrangement of the several parts without departing from the spirit and scope of my invention; and hence I do not intend to be limited to the details herein shown and described, except as they may be included in the claims.

What I claim is:—

1. A stock screw for extruding machines, said screw having a plurality of portions provided with a single thread and a plurality of portions provided with a plural thread.

2. A stock screw for extruding machines, said screw having a plurality of portions provided with a single thread and a plurality of portions provided with a double thread.

3. A stock screw for extruding machines, said screw having a plurality of portions provided with a single thread and a plurality of portions provided with a plural thread, said portions being alternately arranged.

4. A stock screw for extruding machines, said screw having a plurality of portions provided with a single thread and a plurality of portions provided with a double thread, said portions being alternately arranged.

5. A stock screw for extruding machines, said screw being formed as a unit and provided with continuous threads, one of the threads having a greater extent than another and the latter lying within the former.

6. A stock screw for extruding machines, said screw being formed as a unit and provided with two continuous threads, one of the threads having a greater extent than the other and the latter lying within the former.

7. A stock screw for extruding machines, said screw being formed as a unit and provided with continuous threads, one of the threads having a greater extent than another and the latter lying within the former adjacent the shank.

8. A stock screw for extruding machines, said screw being formed as a unit and provided with two continuous threads, one of the threads having a greater extent than the other and the latter lying within the former adjacent the shank.

9. A stock screw for extruding machines, said screw being formed as a unit and having continuous threads, one of the threads having a greater extent than another and the latter lying at intervals within the former.

In testimony, that I claim the foregoing as my invention, I have signed my name this 24th day of May, 1929.

VERNON E. ROYLE.